Nov. 14, 1939.　　　P. HEINISCH　　　2,180,236
FINDER
Filed Oct. 20, 1937
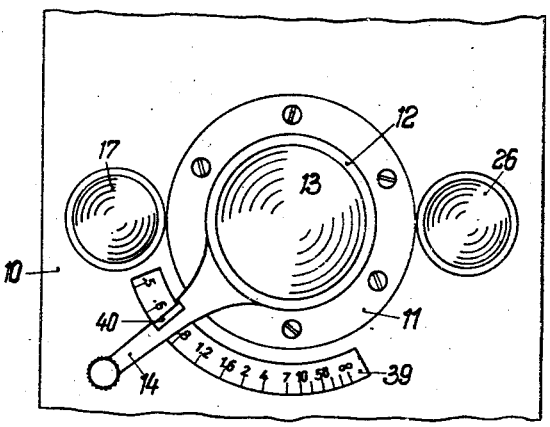
Fig. 2
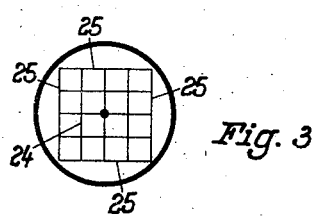
Fig. 3
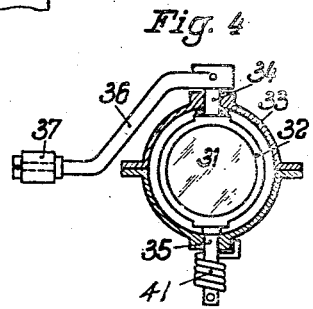
Fig. 4
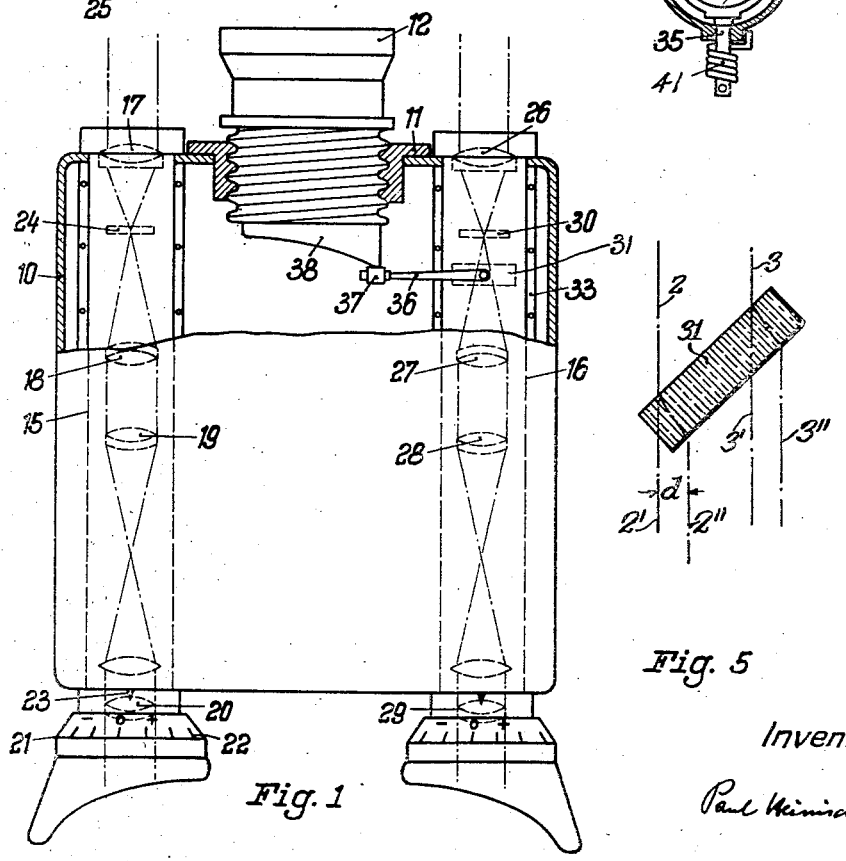
Fig. 1
Fig. 5
Inventor:
Paul Heinisch.

Patented Nov. 14, 1939

2,180,236

UNITED STATES PATENT OFFICE 2,180,236

FINDER

Paul Heinisch, Berlin-Zehlendorf, Germany, assignor to Askania-Werke A. G., a corporation of Germany Application October 20, 1937, Serial No. 170,093
In Germany October 27, 1936

3 Claims. (Cl. 95—44)

This invention relates to improvements in finders operating on the stereoscopic principle, more particularly to finders used in connection with photographic cameras for automatically focussing the objective lens of the camera.

It is well-known in the art that a mark or reticle in the center of the field of view of a stereoscopic sighting device, for example a binocular telescope, conveys upon an observer the impression as being infinitely distant. This stereoscopic effect is produced by a combination of the images of the two marks or reticles taken from points of view a little way apart, whereby the picture gets apparent solidity or depth. By moving one of the marks or reticles in a direction normal to the path of light a stereoscopic effect is produced as of a reticle moving towards or from the observer. The displacement of the mark or reticle relatively to the center of the field of view thus becomes a measure of the distance of an object appearing in the stereoscopic apparatus in equal distance as the reticle.

Inasmuch as the displacement of the mark or reticle relatively to the center of the field of view is relatively small, it is accordingly difficult to operate an indicator from such small movements. It is an object of this invention to provide a novel finder in which the reticles are fixed, while a deflection of their images is effected by optical means permitting a more rugged construction and a more accurate performance of the device.

It is a further object of this invention to provide a novel camera finder having no parallax with respect to the camera lens, whereby a very correct measurement of distance for focussing the objective lens is obtainable.

It is a further object of this invention to provide in a finder of a stereoscopic type a novel mark or reticle permitting an observer accurately to measure the distance of an object positioned closely to the edge of the field of view. Stereoscopic finders having only a center mark do not permit an accurate measurement of the distance of objects positioned at the edge of the picture as a center mark cannot be made to register therewith.

Further aims, objects, and advantages of this invention will appear from a consideration of the description which follows with the accompanying drawing showing for purely illustrative purposes an embodiment of this invention. It is to be understood, however, that the description is not to be taken in a limiting sense, the scope of this invention being defined in the appended claims.

Referring to the drawing:

Fig. 1 is a diagrammatic plan view, partly in section, of a photographic camera having an objective lens and a camera finder operatively connected therewith.

Fig. 2 is an elevation of Fig. 1.

Fig. 3 shows a preferable form of a reticle.

Fig. 4 is a sectional elevation of the reticle deflecting element of the finder.

Fig. 5 is a diagram illustrating the principle of operation of the reticle deflecting element.

In the drawing all camera elements not essential for an explanation of the invention are omitted for the sake of clearness.

A camera casing 10 is provided with an inwardly threaded flange 11 secured thereto and receiving an outwardly threaded lens holder 12 for the objective lens 13. For focussing adjustment of the lens the holder is shown as provided with an arm 14 for imparting a rotary movement to the lens holder 12, whereby the same is screwed inwardly or outwardly relatively to the flange 11.

A stereoscopic finder is shown in the illustrated embodiment in the form of a binocular telescope comprising a finder element 15 for the left and a finder element 16 for the right eye. The left element is provided with an objective 17 producing an upside down image which is again inverted to appear upright by optical means. In the illustrated example a system of inverting lenses 18 and 19 for this purpose is shown. An ocular 20 is shown as being adjustable in the conventional manner by means of a threaded cap 21. The cap may be provided with usual graduation 22 cooperating with a pointer 23. In a focal plane of the finder element a reticle 24 is fixedly arranged.

In Fig. 3 a preferred form of reticle is shown consisting of a network of lines extending over the field of view and indicating with marginal lines 25 the limits of the photographic field.

The optical elements of the finder element 16 correspond to those described in connection with the finder element 15 and comprise an objective lens 26, a system of inverting lenses 27 and 28 and a system of ocular lenses 29. A reticle in the path of light of the finder element is shown at 30, the reticle being of identical design as the first reticle 24.

For deflecting the image of one reticle in order to produce a stereoscopic effect a transparent light deflecting optical member is arranged in the path of light of one finder. In the illustrated example a plate glass member 31 is shown in a holder 32 the latter being mounted for tilting movement in pivots 34, 35 in the outer tube 33 of the finder element 16. The pivot 34 bears an arm 36 with a roller 37. The pivot 35 is connected to a helical spring 41 tending to turn the holder 32 in one direction in order to maintain the roller 37 in contact with a surface of a cam 38 integral with or connected to the lens holder 12. The plate glass member thereby becomes operatively connected with the focussing device of the camera.

The operation of the device will become clear from a consideration of Fig. 5 illustrating the deflection of rays of light by means of the plate glass member 31. If the plate glass member is passed through by rays of light normal to its plane surfaces no deflection occurs. An observer will accordingly see the reticle 30 in exactly the position in which it is mounted in the finder tube 33. If the plate glass member 31 becomes tilted, however, it appears from Fig. 5 that rays of light 2, 3 will not leave the plate glass member in their original direction 2', 3', but will be deflected by an amount $d$ into a new direction 2", 3". Accordingly, the reticle viewed through the tilted plate glass member will appear displaced in a direction normal to the path of light.

The operation of the invention is accordingly as follows:

In order to focus the camera the focussing mechanism 14 is actuated causing a tilting movement of the plate glass member 31. The cam 38 is now so shaped that if the stereoscopic image of the reticle appears to be in the same distance from the camera as the object to be photographed, the objective lens is in proper focus. For convenience the focussing device may be provided with a scale 39 and a knife edge pointer 40 for reading the actual distance of the object.

Inasmuch as the combined stereoscopic image appears to come from a point half way between, and distant from, the oculars of the finder elements it is thus possible to obtain in the finder precisely the same field of view free from parallax as it is obtained by the camera lens. For this reason the optical axes of the telescopic finders are arranged parallel to, in the same plane with, and equally spaced from the optical axis of the camera lens 13. Such arrangement is shown in Fig. 2.

The novel reticle 24 permits the stereoscopic finder to be adjusted to any object inside its field of view regardless whether the object appears in the center of the field of view or close to an edge thereof, as the network of lines extends over the entire field of view.

Obviously the present invention is not restricted to the particular embodiment herein shown and described. Moreover it is not indispensable that all the features of this invention be used conjointly, since they may be employed advantageously in various combinations and sub-combinations.

What is claimed is:

1. The combination with a camera having an objective lens and means for focussing said lens; of a pair of telescopic finders, the optical axes of which being arranged parallel to, in the same plane with, and equally spaced from the optical axis of said objective lens; a fixed reticle in the path of light of either finder; a plate glass member movably arranged in one of said finders; and means operable by said focussing means for tilting said plate glass member relatively to the axis of the respective finder, whereby the image of the reticle in the respective finder becomes deflected in a direction normal to the tilting axis and a stereoscopic picture is produced of a reticle as moving towards and from the camera.

2. The combination with a camera having an objective lens and means for focussing said lens; of a pair of telescopic finders the optical axes of which being arranged parallel to, in the same plane with, and equally spaced from the optical axis of said objective lens, a fixed reticle in the path of light of either finder and consisting of a network of lines extending over the field of view; a plate glass member moveably arranged in one of said finders; and means operable by said focussing means for tilting said plate glass member relatively to the axis of the respective finder, whereby the image of the reticle in the respective finder becomes deflected in a direction normal to the tilting axis and a stereoscopic picture is produced of a reticle as moving towards and from the camera.

3. The combination with a camera having an objective lens and means for focussing said lens; of a pair of telescopic finders, the optical axes of which being arranged parallel to, in the same plane with, and equally spaced from the optical axis of said objective lens; a reticle in the path of light of either finder; means operable by said focussing means for deflecting the image of the reticle in one of said finders in a direction normal to the optical axis of the respective finder, whereby a stereoscopic picture is produced of a reticle as moving towards and from the camera.

PAUL HEINISCH.